July 29, 1947.  J. C. CROWLEY  2,424,802
RUBBER VALVE STEM
Filed Feb. 28, 1942  2 Sheets-Sheet 1
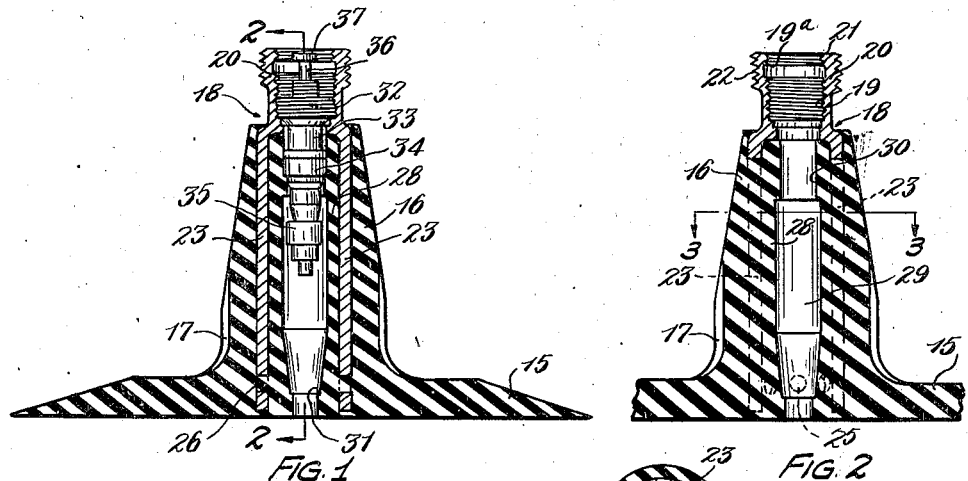
FIG. 1  FIG. 2
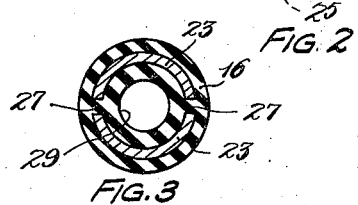
FIG. 3
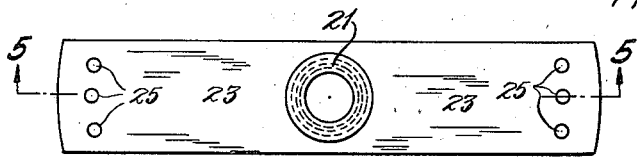
FIG. 4
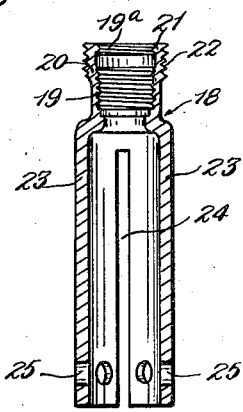
FIG. 6
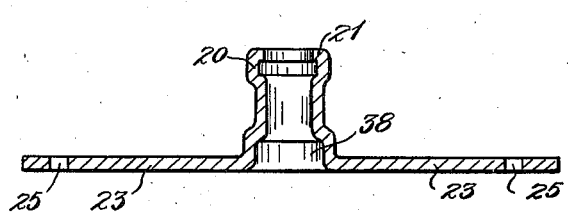
FIG. 5
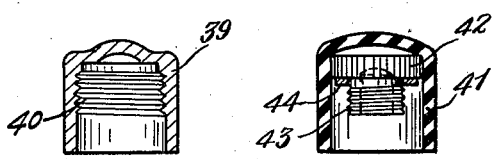
FIG. 6-A  FIG. 6-B
INVENTOR.
JOHN C. CROWLEY
BY Kwis Hudson & Kent
ATTORNEYS July 29, 1947.    J. C. CROWLEY    2,424,802
RUBBER VALVE STEM
Filed Feb. 28, 1942    2 Sheets-Sheet 2

INVENTOR.
JOHN C. CROWLEY
BY Kwis Hudson & Kent
ATTORNEYS

UNITED STATES PATENT OFFICE 2,424,802

RUBBER VALVE STEM

John C. Crowley, Cleveland Heights, Ohio, assignor to The Dill Manufacturing Company, Cleveland, Ohio, a corporation of Ohio Application February 28, 1942, Serial No. 432,863

5 Claims. (Cl. 152—430)

This invention relates to a rubber valve stem such as is used with the inner tube of a pneumatic tire or with some other inflatable article.

An object of the invention is to provide an improved rubber valve stem which can be economically produced and which will be efficient in use.

Another object is to provide a rubber valve stem with a rigid valve core retaining insert so mounted in the stem that its retention in proper position therein is not dependent upon the adhesion between the rubber of the stem and the material of the insert.

Another object is to provide a rubber valve stem having a portion of a rigid valve core retaining insert embedded in the stem and mechanically held in position therein.

A still further object is to provide a rubber valve stem in which a portion of a rigid valve core retaining insert is embedded in the stem in such manner that air leakage cannot take place between the material of the stem and the surfaces of the embedded portion of the insert.

Another and further object is to provide a rubber valve stem with a portion of a rigid valve core retaining insert molded in the stem so as to have the material of the stem arranged on both the inner and outer surfaces of the said portion of the insert.

Another object is to provide a rubber valve stem as specified in the last named object, and wherein the stem material is arranged on both the inner and outer surfaces of the said portion of the insert throughout the length of the rubber valve stem.

Still another object is to provide a rubber valve stem having a rigid valve core retaining insert mounted therein and which stem is so constructed that a valve core mounted in said insert will have air sealing engagement with the rubber material of the stem.

A further object is to provide a rubber valve stem with a rigid valve core retaining insert therein and which insert is so constructed and mounted in the stem that the insert can be formed of material irrespective of whether or not rubber adheres thereto effectively by vulcanization.

Another object is to provide an improved valve core retaining insert for a rubber valve stem and which insert can be stamped from thin gauge sheet metal in an efficient manner and can have formed therein at substantially the same location thereon both internal and external screw threads.

Another object is to provide an improved method of manufacturing rigid valve core retaining inserts for rubber valve stems.

Further and additional objects and advantages not hereinbefore specifically set forth will become apparent during the detailed description which is to follow of several embodiments of the invention. Referring to the accompanying drawings, Fig. 1 is a longitudinal sectional view, on an enlarged scale, through a rubber valve stem and insert embodying the present invention and shows a conventional removable valve core mounted in the stem and insert and in air sealing engagement with the rubber material of the rubber stem and retained in position by its threaded engagement with the insert.

Fig. 2 is a sectional view similar to Fig. 1 but with the valve core omitted and is taken along a different line than is Fig. 1, namely, along line 2—2 of Fig. 1, looking in the direction of the arrows.

Fig. 3 is a transverse sectional view taken on line 3—3 of Fig. 2, looking in the direction of the arrows.

Fig. 4 is a plan view of the sheet blank from which the insert is stamped and shows the same as it appears at an intermediate stage in the manufacture of the insert.

Fig. 5 is a sectional view of the blank shown in Fig. 4 and is taken along line 5—5 of Fig. 4, looking in the direction of the arrows.

Fig. 6 is a longitudinal sectional view through the completed insert and is taken along substantially the same line as the sectional view of Fig. 1.

Fig. 6a is a longitudinal sectional view through a metal dust cap which may be employed with the valve stems shown in the drawings.

Fig. 6b is a view, partly in longitudinal section and partly in elevation, of a dust cap which may be employed with the valve stems shown in the drawings, said dust cap comprising a rubber cup shown in section and within which is a metal cap shown in elevation and having an externally threaded tubular portion adapted to screw interiorly into the insert of the valve stem.

Figure 7:
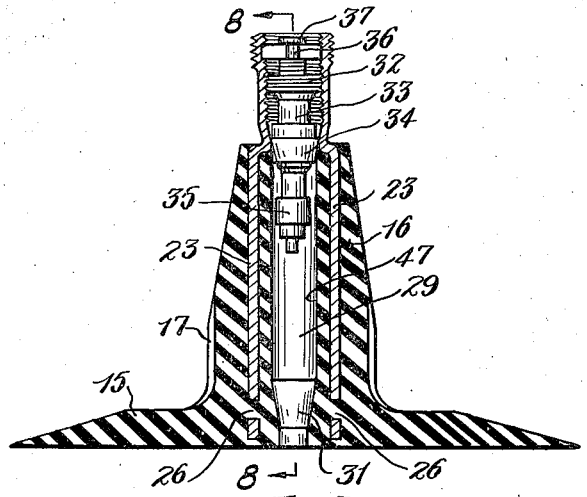
Fig. 7 is a longitudinal sectional view through a rubber valve stem embodying the invention and is similar to Fig. 1 but illustrates a different form of valve stem from that shown in said Fig. 1.
Figure 8:
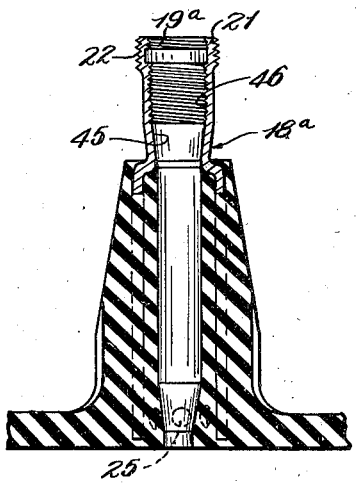
Fig. 8 is a longitudinal sectional view of the rubber valve stem shown in Fig. 7 but with the valve core omitted and is taken along line 8—8 of Fig. 7, looking in the direction of the arrows.
Figure 9:
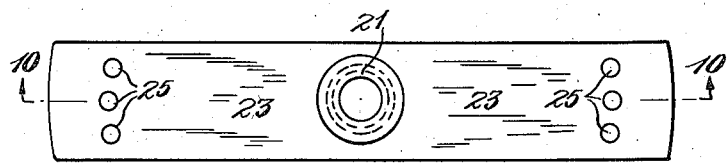
Figs. 9, 10 and 11 are views similar to Figs.
Figure 10:
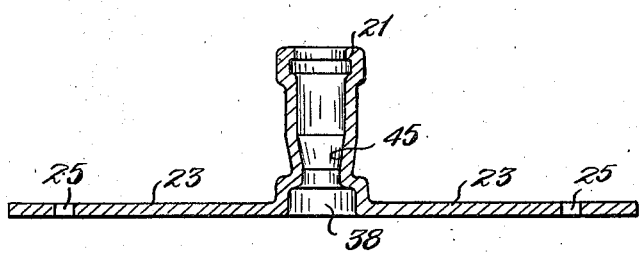
Figure 11:
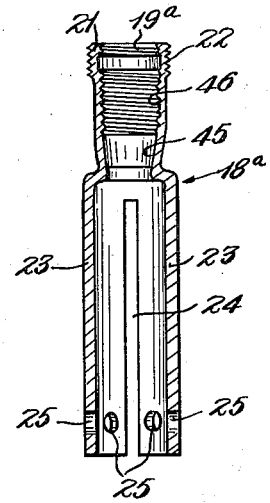

4, 5 and 6, respectively, and illustrate the blank from which the insert of Fig. 7 is formed at an intermediate stage in its manufacture and the finished form of said insert.

Effective adhesion of rubber to metal by vulcanization of the rubber is difficult to obtain with certain kinds of metals. Consequently it has been the practice in manufacturing rubber valve stems in which the adhesion of the rubber to the metal inserts is relied on to retain the inserts in the stems to make the inserts of a metal to which rubber adheres effectively by vulcanization. The metal inserts for rubber valve stems are usually formed from brass for this reason and also because the brass inserts resist corrosion when the stems are in use. However, brass inserts are expensive, relatively speaking, and at the present time brass is difficult to obtain for this purpose.

The present invention contemplates a rubber valve stem construction in which the rigid valve core retaining insert is mechanically held in the stem by the interlocking of the material of the stem with the insert so that the adhesion of the rubber to the insert is not an essential or critical consideration, wherefore the insert may be constructed from various metals or other rigid materials irrespective of their adhesive affinity to the vulcanized rubber. This enables the inserts to be formed of materials which are cheaper and which can be more economically manufactured into the insert and also at the present time are more available for this purpose.

In the use of rubber valve stems in which rigid valve core retaining inserts are employed, leakage of air frequently occurs between the adjacent surfaces of the inserts and the rubber stems due to poor adhesion of the rubber material to the inserts or improper embedding of the inserts in the rubber stems.

The rubber valve stem contemplated by the present invention eliminates the possibility of such air leakage, since all of the surfaces of the insert within the stem are covered by and molded in the rubber material of the stem and hence air has no access to such surfaces of the insert.

The invention further contemplates a rigid valve core retaining insert for a rubber valve stem and which insert can be economically and efficiently produced from sheet material by stamping and forming operations.

Referring to Figs. 1 to 3 inclusive, the rubber valve stem comprises a rubber base 15 and a rubber stem proper portion 16 integral with the base and extending outwardly from the center of the base. The stem proper may be tapered toward its outer end, as shown, while suitable air vent grooves 17 may be provided adjacent to the junction of the base and stem proper as will be well understood in the art. The rubber valve stem has secured therein an insert indicated generally at 18.

The insert 18 may be formed from any suitable sheet metal or rigid material, but preferably is stamped and formed from thin gauge sheet steel in a manner later to be explained. The insert 18 at its outer end is tubular and is internally threaded, as indicated at 19. The tubular outer end portion of the insert at the extreme outer end thereof has a radially expanded portion 20, the free end of which is flanged inwardly as indicated at 21. The radially expanded portion 20 is provided with external threads 22 to enable a valve or dust cap to be screwed onto the stem if desired, while the inner periphery of the flange 21 is threaded as indicated at 19a. The opening defined by the inner periphery of the flange 21 is of the same diameter as the internally threaded bore of the outer end portion of the insert and the threads 19a are really a continuation of the internal threads 19 and can be formed in the insert by the same tap that forms the threads 19.

As previously explained, the insert 18 is made from thin gauge sheet steel. This material is not sufficiently thick to permit forming therein at the same location both internal and external threads. Consequently the provision on the insert of the radially enlarged portion 20 and the inwardly extending flange 21 overcomes this difficulty and makes it possible to provide the external threads 22 for the valve cap and at the same time to have the bore in the outer end of the insert internally threaded with the threads 19 and 19a. The unthreaded offset connecting the enlarged portion 20 with the insert provides the required metal so that the external threads 22 and the internal threads 19 can overlap. This permits the external threads 22 to be of sufficient length to receive and retain a valve or dust cap on the stem. The flange 21 provides the required metal thickness for the overlapping external threads 22 and the internal threads 19a.

The tubular outer end portion of the insert 18 has integral legs 23 extending from its inner end. The legs 23 are arcuate in cross section from near their upper ends to their lower ends and are separated by diametrically opposed longitudinally extending spaces 24. The legs 23 when the insert is in its finished form constitute what may be termed a substantially cylindrical skirt or sleeve provided with elongated diametrically opposed slots formed by the spaces 24. The legs 23 of the insert are each provided near their lower ends with a plurality of openings 25.

The insert 18 in its finished form is molded in the rubber valve stem when the latter is molded and vulcanized to cure the same. The tubular outer end portion of the insert extends beyond the outer end of the stem proper portion 16 of the rubber valve stem, while the legs 23 that form the skirt or sleeve of the insert are embedded in the rubber valve stem and extend almost to the flat surface of the base 15 of the rubber valve stem which contacts the inner tube or other inflatable article to which the stem is attached in use. The rubber of the valve stem is molded on the insert both interiorly and exteriorly thereof and extends through the openings 25 in the legs 23 of the insert, as indicated at 26 in Fig. 1, and also extends through the spaces 24 between the legs 23, as indicated at 27 in Fig. 3. The rubber molded on the interior of the skirt or sleeve of the insert is indicated at 28 and extends from the said flat surface of the base 15 outwardly to the junction of the skirt or sleeve of the insert with the tubular outer portion thereof as clearly shown in Figs. 1 and 2.

The rubber valve stem, and particularly the portion formed by the rubber material 28 and within the skirt of the insert, is provided with a bore 29 therethrough which has a reduced portion 30 for a purpose later to be explained. The bore 29 is provided near its inner end with an internal shoulder 31 also for a purpose later to be pointed out.

The insert is molded and vulcanized in the rubber valve stem as previously explained. The vulcanization of the rubber valve stem may cause adhesion between the rubber and the insert but the effectiveness of this adhesion is not critical or controlling. The portions 26 of the rubber material which extend through the openings 25 in the legs 23 of the insert skirt or sleeve act as mechanical anchors or rivets to maintain the insert in position in the rubber stem and to prevent the insert from blowing out of the stem under air pressures which may be in the tire tube or other inflatable article to which the stem is attached. Therefore the adhesion of the rubber to the insert is not necessary to retain the insert in the rubber valve stem.

The legs 23 of the insert are completely embedded in the rubber material of the stem and all of the surfaces of said legs are covered by the externally and internally located rubber material and by the rubber portions 27 located in the spaces 24. Consequently no air has access to the embedded surfaces of the legs 23 of the insert. Therefore adhesion of the rubber material to the insert need not be relied upon to prevent leakage of air along the surfaces of the insert.

In Fig. 1 a conventional removable valve core is shown mounted in operative position in the valve stem. This valve core comprises an externally threaded plug 32 which is swivelly connected to a barrel 33 that has intermediate its ends and externally a tapered gasket 34. The lower end of the barrel 33 constitutes a valve seat against which seats a valve 35 fixed on the lower end of a valve pin 36 that extends through the barrel 33 and the plug 32 and is provided at its outer end with a head 37 adapted to be engaged by the pin of the ordinary air chuck to unseat the valve 35 when inflating the article or tire tube. The valve core is operatively mounted in the valve stem by screwing the threaded plug 32 thereof into the tubular internally threaded outer end of the insert until the tapered external gasket 34 on the barrel 33 of the core is in air sealing engagement with the reduced portion 30 of the bore 29 through the rubber valve stem.

The valve core shown in Fig. 1 has its valve spring mounted internally of the valve core. Some forms of conventional removable valve cores utilize an external spring located above the swivelled threaded plug of the core and surrounding the valve pin, while other forms have below the valve 35 a valve spring which abuts at its lower end an abutment member. The internal shoulder 31 in the bore 29 is provided for the purpose of supporting the abutment member at the inner end of the valve spring when valve cores of the last mentioned type are used in the valve stem.

As previously stated, the insert 18 is stamped and formed from thin gauge sheet material, such as sheet steel. In forming the insert a flat blank of the sheet steel is first stamped to provide centrally and midway of its ends a cylindrical relatively short cup, then by means of suitable dies the cup is elongated and somewhat reduced in diameter from its closed end inwardly to the larger cylindrical portion indicated at 38 in Fig. 5 and which portion in the finished insert constitutes the junction of the skirt with the tubular outer end portion of the insert. When the blank has been thus formed the closed bottom of the cup is punched out and then the outer free end portion of the cup is radially expanded to provide the enlarged portion 20 of the finished insert. After the blank has reached this stage of its manufacture the radially enlarged portion 20 thereof at its extreme outer end is flanged inwardly to provide the inwardly extending flange 21 of the finished insert. Then the tubular portion produced from the cup, as already explained, is threaded to provide the internal threads 19a and 19 and the external threads 22. As already explained, the sheet material is too thin to permit the formation of both internal and external threads, but by providing the radially expanded portion 20 and then the internally extending flange 21 this difficulty is overcome and the internal threads 19a and 19 and the external threads 22 can be formed on the tubular portion of the insert.

When the insert has reached this point in its manufacture the legs 23 are flat and extend substantially perpendicularly from the tubular portion of the blank, as indicated in Figs. 4 and 5. The legs 23 then by suitable forming operations and dies are made arcuate in cross section and are bent downwardly to provide the extended substantially circular elongated slotted skirt or sleeve of the finished insert. It will be appreciated that this manner of forming the insert is substantially more efficient and more readily accomplished than if it would be necessary to draw the blank so as to have an elongated continuous cylindrical sleeve or skirt thereon.

The openings 25 in the legs 23 may be formed therein at any suitable stage of the manufacturing operation and preferably are punched in the legs prior to the stamping and forming of the blank by the operations above referred to.

In Fig. 6a there is shown in section a metal valve or dust cap 39 internally threaded as indicated at 40 and said dust cap can be screwed externally upon the outer tubular and exposed portion of the insert 18, it being understood that the threads 40 interengage with the external threads 22 to permit the screwing on or off of the cap. When the cap 39 is screwed downwardly completely its lower edge should abut the external shoulder at the outer end of the rubber stem proper portion 16 and the inner end of the tubular portion of the metal insert 18.

In Fig. 6b another form of valve cap which can be used with the stem is indicated. A rubber cup 41 is shown in section and mounted in this cup at the closed end thereof is a metal cap comprising a head 42 and a reduced externally threaded tubular portion 43. In applying the cap shown in Fig. 6b the rubber sleeve 41 is telescoped upon the tubular outer end of the metal insert 18 and the sleeve is rotated to cause the tubular portion 43 of the metal cap within the sleeve to screw into the tubular portion of the metal insert, it being understood that the external threads of the portion 43 cooperate with the internal threads 19a and 19 of the insert and that the valve pin 36 of the valve core can be accommodated within the tubular portion 43 of the cap. The cap shown in Fig. 6b includes a gasket 44 located around the portion 43 and engaging the inner surface of the head 42 and said gasket when the cap is screwed to final position in the insert contacts the outer end of the insert. It will be seen that when the rubber sleeve 41 with the metal cap therein is mounted on the valve stem the outer open end of the stem is completely closed against the entrance of dirt and water and that the exposed outer tubular portion of the metal insert is protected from the weather by the rubber cup 41.

Of course the rubber cup 41 can be omitted and the metal cap formed of the head 42 and portion 43 used alone as a valve or dust cap. Also the rubber cup 41 may be so formed and dimensioned as to fit upon the outer end of the insert and be retained thereon by friction or in other suitable manner and when so used may act alone as a sufficient valve or dust cap for the stem.

In the form shown in Figs. 7 to 11 inclusive certain of the features of the rubber valve stem and the rigid valve core retaining insert mounted therein are identical with the corresponding parts of the rubber valve stem and insert in the previously described form and will be identified herein by the same reference characters.

The metal insert 18a in the form of valve stem shown in Figs. 7 to 11 inclusive differs from the insert 18 previously described in that the outer tubular end portion of the insert 18a is longer than the corresponding portion of the insert 18. The bore of the outer tubular portion of the insert 18a is provided with a smooth tapered portion 45, while the internal threads 46 which correspond to the internal threads 19 of the first described insert extend a greater length in the bore of the insert 18a. The rubber material of the stem indicated at 47 and which is within the legs 23 of the insert 18a is not formed so as to have the reduced bore portion 30 therein of the previously described valve stem.

It will be seen that when the removable valve core is mounted in the rubber valve stem shown in Fig. 7 the tapered gasket 34 on the barrel 33 of the core sealingly engages the tapered bore portion 45 of the outer tubular end of the insert and also the rubber material 47 at the upper end of the latter. With the exceptions above noted the rubber valve stem and insert shown in Figs. 7 to 11 inclusive are identical with the rubber stem and insert illustrated and described in connection with Figs. 1 to 6 inclusive.

The insert 18a is made in the same manner as is the insert 18 but during the making of the insert 18a the cup which matures into the tubular outer end portion of the insert is stamped and drawn to longer form than in the previously described insert 18 and is provided with the tapered bore portion 45, as previously referred to. The insert 18a is molded and vulcanized in the rubber valve stem in the same manner as is the insert 18 in the first described form.

It will be seen that in both forms illustrated and embodying the invention the metal inserts are mechanically held in the rubber valve stems and therefore the maintaining of the inserts in position in the stems is not dependent on the adhesion of the rubber material to the inserts. It will also be noted that in both forms the metal inserts have all their surfaces, inwardly of the point where the gasket 34 of the valve core sealingly engages, embedded or covered by the rubber material of the stems and hence air has no access to the surfaces. Therefore adhesion of the rubber material to the metal inserts need not be relied upon to prevent air leakage along the surfaces of the insert.

In both forms illustrated and described the inserts are produced economically and efficiently by stamping and forming operations and the construction of the inserts is such that although they are made of sheet metal they can be internally and externally threaded at the tubular outer ends of the inserts. The inserts can be formed from sheet material which is more readily available at the present time than is brass from which inserts are ordinarily made.

Although preferred embodiments of the invention have been illustrated and described herein it should be understood that the invention is susceptible of various modifications and adaptations within the scope of the appended claims.

Having thus described my invention I claim:

1. A relatively thin gauge rigid sheet material insert for a rubber valve stem including a tubular outer end of substantially uniform wall thickness and having an internally threaded portion and an enlarged externally threaded portion radially offset from said first portion, said portions being integral with each other, said enlarged externally threaded portion being located at the free end of the tubular outer end of the insert and being provided with an inturned flange having its inner periphery threaded and defining an opening of the same diameter as the internal diameter of the interiorly threaded portion, said insert being provided with an integral skirt extending from said tubular outer end.

2. An insert for a rubber valve stem as defined in claim 1 and wherein said skirt includes circumferentially spaced transversely arched legs.

3. A valve stem comprising a rubber base and a rubber stem proper extending therefrom, and a relatively thin gauge sheet material valve retaining insert including a tubular outer portion having a radially enlarged outer end which is provided at its tip with a radially inwardly extending flange, said outer end of the tubular portion being provided with external threads while substantially the remainder of said portion is provided with internal threads, said flange being provided on its inner periphery with threads corresponding in lead and pitch to said internal threads, said insert further including a skirt integral with said tubular portion and completely embedded in said stem proper and extending longitudinally thereof with the material of the latter located throughout the length of the skirt both externally and internally thereof.

4. A valve stem comprising a rubber base and a rubber stem proper extending therefrom, and a relatively thin gauge sheet material valve retaining insert including a tubular outer portion having a radially enlarged outer end which is provided at its tip with a radially inwardly extending flange, said outer end of the tubular portion being provided with external threads while substantially the remainder of said portion is provided with internal threads, said flange being provided on its inner periphery with threads corresponding in lead and pitch to said internal threads, said insert further including a skirt integral with said tubular portion and molded in said stem proper.

5. A valve stem comprising a molded rubber base and a rubber stem proper extending therefrom, and a rigid valve retaining insert including a tubular portion extending outwardly from the free end of the stem proper and an elongated skirt extending from the tubular portion within the stem proper to said base, said tubular portion being provided with internal screw threads to enable a conventional removable valve core to be screwed into the stem and retained therein, said skirt being provided with slots extending longitudinally thereof from said tubular portion to the free end of the skirt, said stem proper being molded around and embedding said skirt with the material of the stem proper extending through said slots and located interiorly and exteriorly of the skirt throughout the length of the skirt, the material within the skirt forming a continuous seamless lining for the skirt and providing a bore through the skirt communicating with said tubular portion and adapted to communicate with the inflatable article to which the valve stem base is to be secured, the material within the skirt being so disposed as to provide a constriction in said bore so located relative to said tubular portion that the barrel of the removable valve core which is screwed into said tubular portion will have sealing engagement with the constriction while the valve seat and valve of the core will be located a substantial distance inwardly of the constriction and within said lining thus presenting no seams or joints for the leakage of air between the rubber stem and the insert inwardly of the sealing engagement between the core, barrel and said constriction.

JOHN C. CROWLEY.

REFERENCES CITED

The following references are of record in the file of this patent:

UNITED STATES PATENTS

| Number | Name | Date |
|---|---|---|
| 2,188,713 | Gora | Jan. 30, 1940 |
| 2,232,530 | Hosking | Feb. 18, 1941 |
| 2,262,169 | Crowley | Nov. 11, 1941 |
| 1,792,619 | Wahl | Feb. 17, 1931 |
| 2,126,770 | Hammond | Aug. 16, 1938 |
| 2,260,646 | Sorokin | Oct. 28, 1941 |